United States Patent
Beck

[19]

[11] Patent Number: 5,522,422
[45] Date of Patent: Jun. 4, 1996

[54] HYDRAULIC PRESSURE REDUCING VALVE

[75] Inventor: Erhard Beck, Weilburg, Germany

[73] Assignee: ITT Automotive Europe GmbH, Germany

[21] Appl. No.: 433,367

[22] Filed: May 5, 1995

[30] Foreign Application Priority Data

Nov. 6, 1992 [DE] Germany ............. 42 37 451.0

[51] Int. Cl.$^6$ .................. B60T 11/34; B60T 13/14
[52] U.S. Cl. .................. 137/505.25; 137/508; 303/9.75
[58] Field of Search ............... 137/505.25, 508; 251/50; 303/9.71, 9.75

[56] References Cited

U.S. PATENT DOCUMENTS

| 1,724,063 | 8/1929 | Anderson | 137/508 |
| 2,524,951 | 10/1950 | Ashton | 137/542 |
| 2,675,649 | 4/1954 | Trevaskis et al. | 137/505.25 |
| 3,680,922 | 8/1972 | Kawai . | |
| 4,813,450 | 3/1989 | Ishiwata et al. | 137/505.25 |
| 4,932,312 | 6/1990 | Sugimoto | 137/508 |
| 5,064,252 | 11/1991 | Fujimori et al. | 303/9.75 |
| 5,066,072 | 11/1991 | Yanagi . | |

FOREIGN PATENT DOCUMENTS

| 1172685 | 2/1959 | France . |
| 2210528 | 7/1974 | France . |
| 3633969 | 3/1984 | Germany . |
| 3702732 | 8/1988 | Germany . |
| 2018921 | 10/1979 | United Kingdom . |
| 2021718 | 12/1979 | United Kingdom . |
| 2098294 | 11/1982 | United Kingdom . |
| 2127508 | 4/1984 | United Kingdom . |
| 9206875 | 4/1992 | WIPO . |

*Primary Examiner*—Stephen M. Hepperle
*Attorney, Agent, or Firm*—Dykema Gossett

[57] ABSTRACT

A noise-minimized pressure reducing valve valve closure member an axial guiding tappet which is formed at its end as a spherical segment, and the diameter of which is adapted to the diameter of an inner bore in the control piston. Along with another valve tappet and a generous dimensioning of the cross-sections of flow passages, axial and radial vibrations of the valve closure member are effectively reduced or attenuated.

To increase the tightness of the pressure reducing valve, for example, the closure member may comprise two closure elements, one of them is made of rubber, while the other one is made of metal. The metal closure element ensures exact pressure control, while the rubber closure element ensures increased tightness.

7 Claims, 3 Drawing Sheets

HYDRAULIC PRESSURE REDUCING VALVE

TECHNICAL FIELD

The present invention relates to a hydraulic pressure reducing valve and more particularly relates to a hydraulic pressure reducing valve having improved noise reduction properties.

BACKGROUND OF THE INVENTION

DE-36 33 969 A1 discloses a generic pressure reducing valve. The described pressure reducing valve includes three chambers to which different pressures are applied. The first chamber, that is the inlet chamber connected to a high-pressure accumulator, is isolated from the adjacent second chamber and the outlet chamber, by a valve (which includes a valve seat on the housing and a spherical valve closure member arranged on the inlet side). The valve closure member is acted upon by a compression spring in the closing direction. The second chamber is isolated from the third chamber and a control chamber, by a floating piston. The floating piston has an axial tappet towards the valve closure member and, from the control chamber, is acted upon by a compression spring in the valve opening direction. The control chamber is exposed to the controlled pressure of a hydraulic brake power booster. A pressure reducing valve of this type serves to apply an amount of pressure to the annular chamber of the hydraulic power booster acted upon by the hydraulic power booster only as high as is actually required to minimize the actuating forces. To ensure the function of the valve, it is necessary that all annular chambers are large, thereby permitting penetration of even large amounts of fluid through the valve. However, a resulting shortcoming is that centering of the spherical closure member is not possible. This is due to the occurrence of pressure fluid turbulences which cause radial and axial vibrations of the ball. Significant noise develops during operation of the pressure reducing valve due to these vibrations.

The object of the present invention is to provide a noise-minimized generic pressure reducing valve.

This object is achieved by designing the valve such that closure member is not movable freely, but is provided with a sort of an axially displaceable spherical joint.

Due to the fact that the spherical segment is not placed in the pressure fluid channel, it does not induce vibrations of the tappet.

With the valve opened, that is, whenever the valve is penetrated by fluid, radial vibrations of the valve closure member can be eliminated by a second tappet providing frictional engagement between the valve closure member and a housing end wall. The second tappet can be attached to the valve closure member or the housing end wall. A self-closing arrangement of the pressure fluid valve serves to increase the reliability in operation. Among other things, this is favoured by an inversion of flow occurring at the outlet-side housing end wall.

There are several embodiments of the valve, each embodiment having enhanced tightness in the closed condition.

In one embodiment, a form-lock between the closure member and a housing part results in the greater adjusting force, which acts upon the control piston at higher pressure, effecting a higher sealing force between the valve seat and closure member.

Another favourable aspect is the use of a bipartite closure member. A metallic closure member ensures exact pressure reduction, while an additional elastomeric closure member enhances the tightness of the pressure reducing valve.

Expediently, the elastomeric closure member can move into abutment against the valve seat only in excess of the closing pressure. This means that, initially, the closing pressure is determined very precisely by the metallic closure member, thereby permitting sealing abutment of the elastomeric closure member only upon continued piston movement. The order is reversed when the valve opens. Initially, the elastomeric closing member lifts from the valve seat. Only subsequently, when the closing pressure is exactly reached, will the metallic closure member lift from the valve seat.

DETAILED DESCRIPTION OF THE PREFERRED EMBODIMENTS

Figure 1:
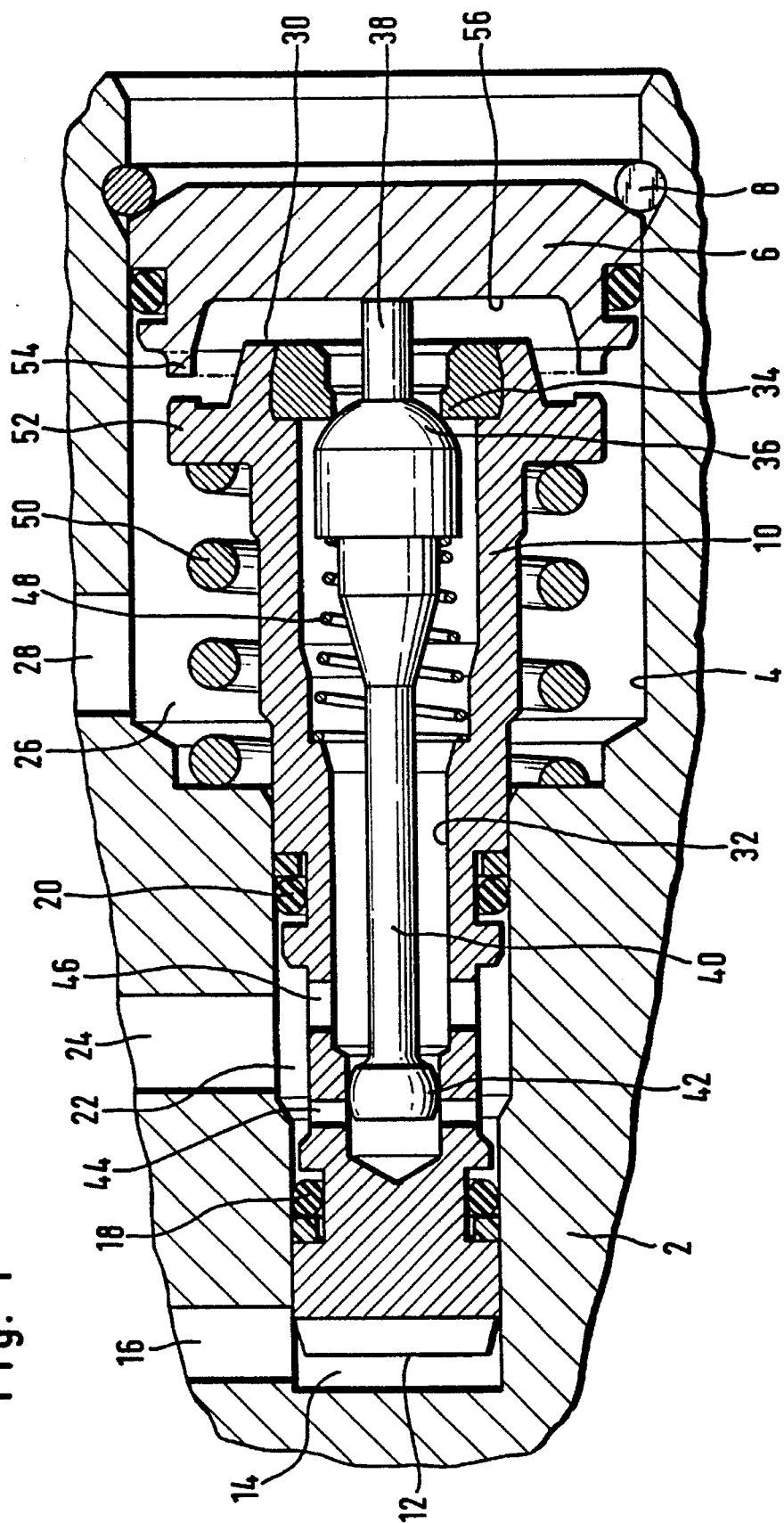
FIG. 1 is a view of a complete hydraulic pressure reducing valve according to the present invention

In FIG. 1, a bore 4 is provided in the housing 2 and is stepped twice towards the housing interior, the cross-sections narrowing. The bore 4 is closed and sealed outwardly by a cover which is retained by a circlip 8.

Inside the bore, a control piston 10 is slidably guided and sealed in relation to the bore wall with medium and small cross-sections. Thus, the control piston 10 confines three pressure fluid chambers. A piston end wall 12 facing the housing interior confines a control chamber 14 which, through a control port 16, is exposed to the controlled pressure of a hydraulic booster. Interposed between two piston seals 18, 20 is an inlet chamber 22 which is connected to a hydraulic high-pressure accumulator through inlet 24. Outlet chamber 26 is arranged between the cover 6 and the inlet chamber 22. The pressure in the outlet chamber 26 is supplied further to the hydraulic booster through outlet 28.

The ratios of surfaces of the control piston 10 at the piston seals 18 and 20 are chosen such that the pressure has the largest effective surface in the outlet chamber 26 and acts in the closing direction so that the valve closes after an amount of pressure has been exceeded which generates the force of a control spring 50 minus the force of a valve spring 48, and, in the presence of higher inlet pressures, the outlet pressure is reduced proportionally, corresponding to the surface ratios.

From its outlet-side frontal end 30, the control piston 10 includes an axial inner bore 32 which extends up to the piston seal 18, separating the inlet chamber 22 from the control chamber 14, and ends there as a blind-end bore. Valve seat 34 is calked with the frontal end 30. Valve seat 34 interacts with the closure member 36 arranged in the inner bore. Towards the cover 6, the closure member 36 is provided with valve tappet 38 which extends through the valve seat 34 and, with the valve opened, abuts on the cover 6. On its side remote from the cover 6, the closure member 36 includes an axial guiding tappet 40 which is almost as long as the inner bore 32 and has the spherical segment 42 at its end. The radius of curvature of the spherical segment 42 is adapted to the radius of the inner bore 32 in this axial area. The spherical segment 42 is arranged in the axial area of the inlet chamber 22.

The control piston 10 has radial passages 44, 46 from the inlet chamber 22 to the inner bore 32 which are disposed axially in front of and behind the spherical segment 42 and serve to vent the inner bore 32. Due to this arrangement, the spherical segment is overflown but not exposed to axial pressure fluid forces. Further, no pressure fluid passage is provided at its periphery, so that vibrations cannot be caused by flow movements.

In the closing direction, the closure member 36 is acted upon by the valve spring 48 which is compressed on a step of the inner bore 32. In addition to the pressure in the control chamber 14, control spring 50 acts on the control piston 6 in the direction so as to open the valve. Control spring 50 is arranged in the outlet chamber 26 and is supported on a step of the bore 4, on the one hand, and acts upon a circumferential radial projection 52 close to the cover-side front end 30 at the control piston 6, on the other hand. On the side of the cover, the projection 52 moves into abutment on spacer elements 54 arranged on the periphery of the cover 6, when the valve is opened. Free pressure-fluid connection to the outlet 28 is ensured thereby.

Inner side 56 of the cover 6 facing the bore 4 is shaped like a bowl, the spacer elements 54 forming the edge of the bowl. The effect is that the flow of pressure fluid penetrating the valve seat 34 is deflected radially outwardly and back in the axial direction. The pressure fluid flow then acts on the projection 52 of the control piston 10 in the direction so as to close the valve.

The cross-sections of the valve penetrated by fluid may be chosen to be relatively large because the valve closure member has two points of support. The spherical segment 42 with its rounding tightly fitting in the bore permits only radial vibrations of the valve closure member 36 over a very narrow angle area. However, such radial vibrations are prevented by abutment of the valve tappet 38 on the cover 6. Due to the large flow cross-sections, a parabolic speed variation of the pressure fluid can develop which exerts an additional axial normal force on the valve closure member 36 in all annular chambers in which fluid flows. Axial vibrations are lessened thereby. Also, radial vibrations are greatly attenuated due to the increased friction occurring with radial vibrations. The faster the valve is penetrated by fluid, the closer becomes the frictional abutment of the valve tappet 38 on the cover 6 so that the tendency to vibrations diminishes further.

Thus, according to the present invention, different noise-damping arrangements are combined which, jointly, provide a quietly operating pressure reducing valve which permits large volume flows.

The pressure reducing valve is open in its unpressurized condition. Projection 52 bears against the spacer element so that the valve closure member 36 is spaced from the valve seat 34 by the valve tappet 38. When an initial pressure is exceeded which is determined by the pressure in the control chamber and the force of the control spring 50, the control piston 10 will move in the direction of the control chamber 14 until, on attainment of the closing pressure, the valve seat 34 adopts the illustrated position in abutment on the closure member 36.

Leakage can occur because two metallic parts, namely the closure member 36 and the valve seat. 34, ensure the tightness of the valve in this configuration, and because, on the other hand, the abutment force between these two parts is determined exclusively by the weak valve spring 48.

However, if the pressure reducing valve does not close reliably, the control piston 10, as a result of the slight further rise of the pressure in the outlet chamber 26, continues to move until it abuts on the back wall of the control chamber 14. Subsequently, the pressure in the outlet chamber 26 increases gradually until it reaches so high an amount that the valve does not operate properly.

Therefore, provisions have been made (as shown in the following Figures) to enhance the tightness of the pressure reducing valve. The illustrated cross-sections may be inserted in FIG. 1 alternatively. The reference numerals in FIGS. 2 to 4 have been multiplied by 100 for elements which are identical in function.

Figure 2:
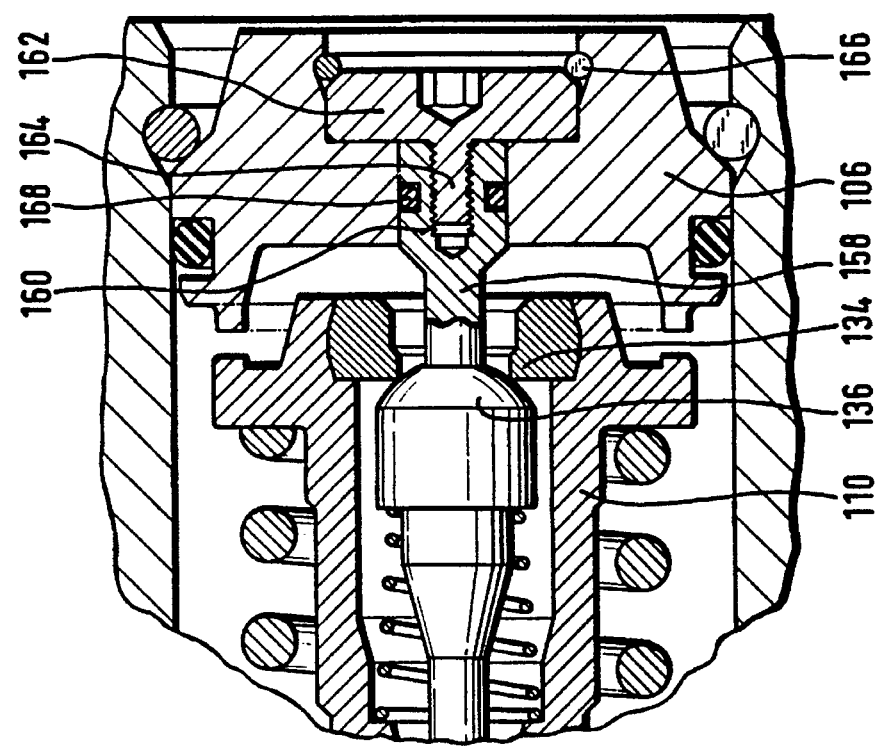

In FIG. 2, closure member 136 has a connecting portion 158 which extends through valve seat 134. The connecting portion 158 has an internal thread 160 into which a threaded bolt 164 shaped on a retaining member 162 is screwed. The retaining member 162 is attached to the cover 106 by way of clip 166. The connecting portion 158 is provided with ring seal 168 for sealing in relation to the atmosphere.

The closure member 136 is positively engaged with the cover 106 and, thus, attached in an axially immovable manner in the way illustrated. When the valve seat 134 moves into abutment on the closure member 136 upon attainment of the closing pressure, the position shown is reached and will not change as the pressure continues to rise. As a result, the force by which the valve seat 134 abuts on the closure member 136 rises upon continued pressure increase. Tightness of the valve is achieved which is enhanced compared to FIG. 1.

Figure 3:
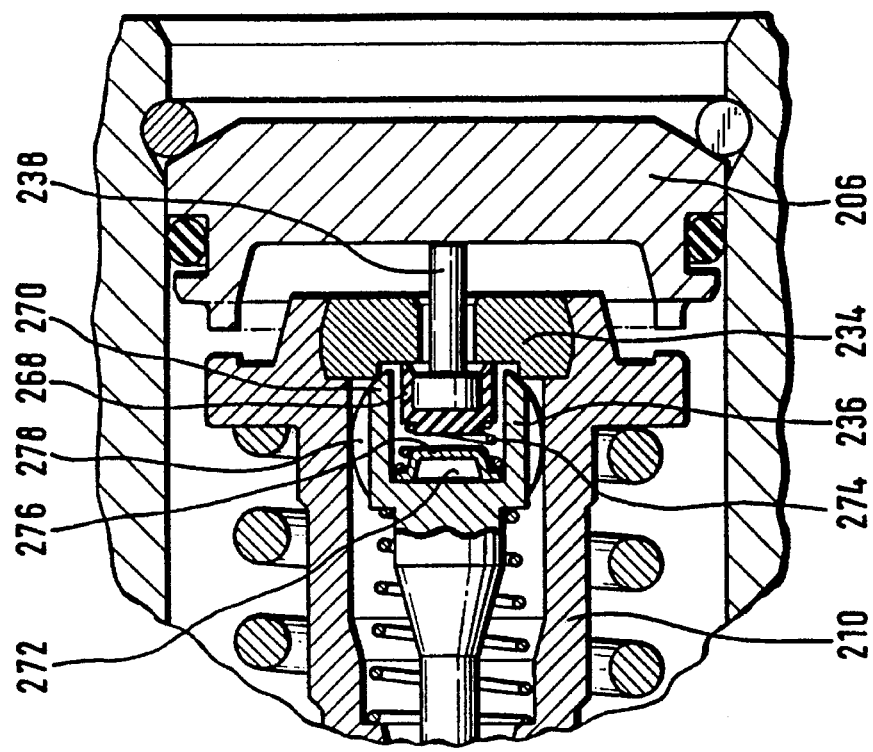
FIG. 2 through FIG. 4 are views of a pressure reducing valve according to the present invention including arrangements increasing the tightness.

The problem of leakage is overcome differently in FIG. 3.

In this configuration, closure member 236 includes two closure elements 268 and 270. The metallic closure element 270 is arranged radially outside the closure element 268 which is made of elastomeric material, for example, rubber.

The closure element 268 is arranged in a cylindrical recess 272 in the closure member 236. The closure element 268 is movable in relation to the closure element 270 and is acted upon by an intermediate spring 274 in the direction of valve seat 234. The intermediate spring 274, additionally, retains the supporting plate 276 in abutment on the bottom of recess 272.

When the valve is closed, as shown, the metallic closure element 270 bears against an edge of valve seat 234, and the elastomeric closure element 268 bears against a surface of valve seat 234. When the valve is opened, the control piston 210 displaces in the direction of the cover 205. The valve tappet 268 lifts from valve seat 234 due to its abutment on cover 206.

When the closure element 268 abuts on the supporting plate 276, upon further displacement of the control piston, the metallic closure element 270 is separated from the valve seat 234.

These actions take place in reverse order when the valve closes. To stabilize the movement of the closure member, guiding lugs 278 are shaped on the closure member 236 and can slide along the inside wall of the control piston 210.

The order of closing chosen for the valve operation has the advantage that the exact action of pressure reduction is performed exclusively by the metallic closure element 270, while the elastomeric closure element 268 serves only to increase the valve tightness and does not have to perform any control functions. Therefore, the elastomeric closure element 268 abuts only if the metallic closure element does not seal off completely so that the control piston displaces further.

Figure 4:
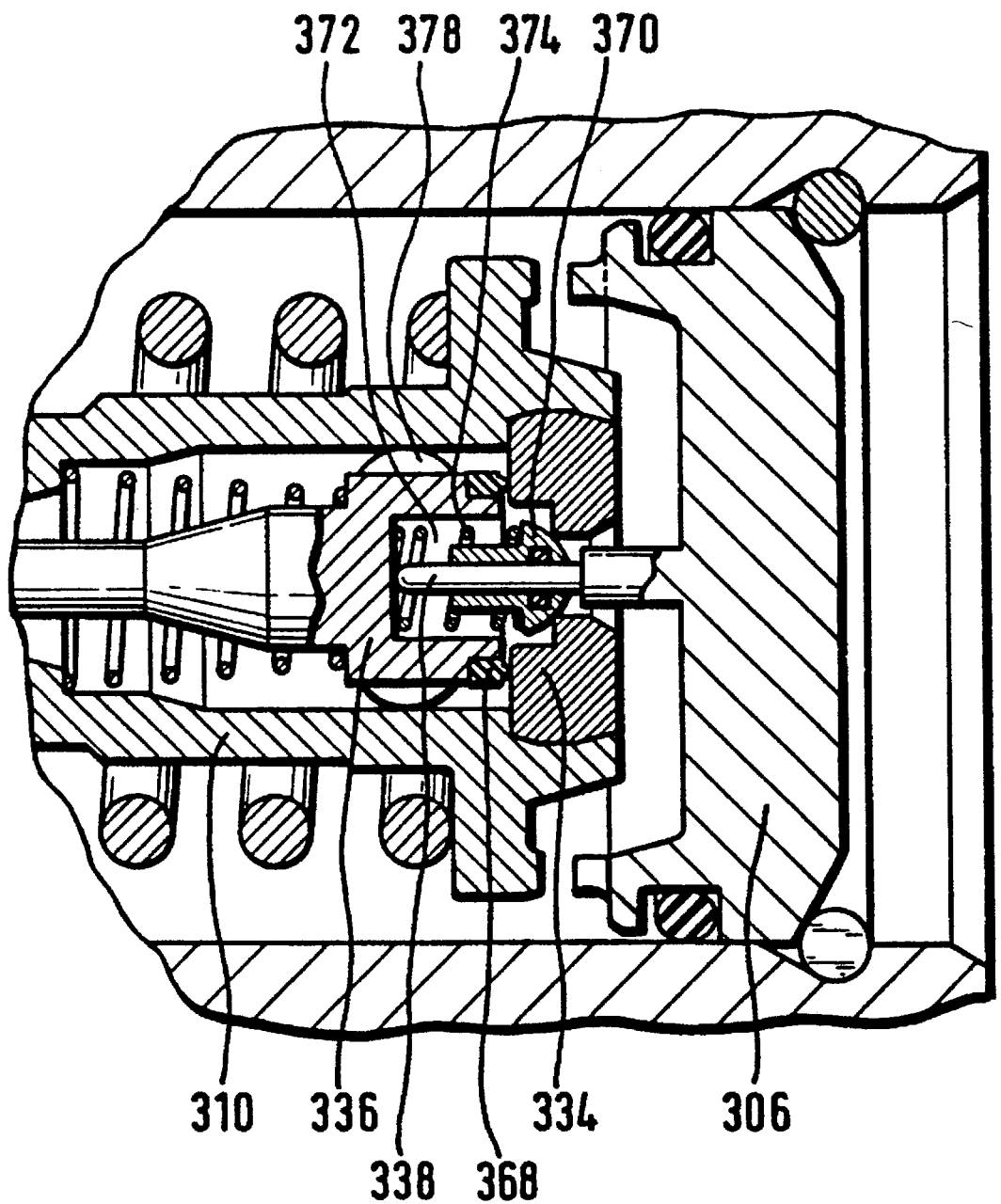

The principle of the arrangement of FIG. 4 is similar to the principle of the arrangement of FIG. 3. The most important difference compared to FIG. 3 is that, in the embodiment of FIG. 4, the metallic closure element is arranged within the elastomeric closure element.

Like in FIG. 3, the closure member 336 also includes guiding lugs 378 which can slide along an inside wall of control piston 310. In this arrangement, too, the elastomeric closure element 368 bears against a surface of the valve seat 334, while the metallic closure element 370 bears against an edge of the valve seat 334.

In contrast to FIG. 3, however, the valve tappet 338 is shaped at the cover 306 in FIG. 4. The valve tappet 338 tapers steplike towards its end. At its thinnest portion, the metallic closure element 370 is sealedly guided in an axially movable manner. Closure element 370 is acted upon by the intermediate spring 374 in the direction of the valve seat 334.

Because the valve tappet 338 abuts on the bottom of recess 372, upon movement of the control piston 310 to the cover 306, initially, the elastomeric closure element 368 lifts from the valve member 304. Only after the step of the valve tappet 338 has reached the metallic closure element 370 will the closure element move away from the edge on the valve seat 234.

Intricate assembly work is necessary for the embodiments according to FIGS. 3 and 4. A great number of advantages is offered thereby which are common to both embodiments. Pressure is controlled exclusively by the metallic closure elements 270 and 370. Only if leakage occurs on this seal will the control piston 210 or 310, respectively, continue to displace so that the elastomeric closure element 268 or 368, respectively, moves into abutment on the valve seat 234 or 334, respectively. Thus, the noise-minimizing abilities of the hydraulic pressure reducing valve are not impaired by the additional inclusion of a rubber seal. In addition, it is advantageous that reliability of tightness is always ensured. Because the elastomeric closure element does not have to control fluid flow, the valve operation will not cause increased wear. Finally, the mechanical stress on the valve seat is reduced considerably compared to FIG. 2.

I claim:

1. A hydraulic pressure reducing valve of the type including a housing, an inlet chamber, an outlet chamber and a seat valve interposed between the inlet chamber and outlet chamber and operated by a control piston, the control piston being acted upon by the force of a control spring in the direction so as to open the valve, and by control pressure, comprising:

a first axial tappet residing in an inner bore wherein said tappet has an end remote from the closure member, wherein said, remote end of said tappet is formed as a spherical segment, the diameter of which is adapted to the diameter of the inner bore.

2. A hydraulic pressure reducing valve as claimed in claim 1, wherein the spherical segment is exposed to the pressure in the inlet chamber on all sides, no pressure fluid passage being provided at its periphery.

3. A hydraulic pressure reducing valve as claimed in claim 1 further comprising a second axial tappet interposed between the closure member and a housing end wall wherein said second axial tappet extends through a valve seat attached to the control piston and provides frictional engagement between the closure member and the housing end wall when the seat valve is open.

4. A hydraulic pressure reducing valve as claimed in claim 1, wherein the closure member is positively connected with a housing end wall by way of a connecting portion which extends through a valve seat attached to the control piston.

5. A hydraulic pressure reducing valve as claimed in claim 3, wherein the housing end wall confines the outlet chamber and is shaped like a bowl so that the pressure fluid flows through the valve seat radially outwardly and, subsequently, is deflected in an axial direction.

6. A hydraulic pressure reducing valve as claimed in claim 1, wherein the closure member includes two closure elements which are movable in relation to each other, the one closure element being made of elastomeric material, while the other closure element is made of metal.

7. A hydraulic pressure reducing valve as claimed in claim 6, wherein the elastomeric closure element is movable into abutment on the valve seat only if the metallic closure element bears against the valve seat.

\* \* \* \* \*